United States Patent
Lee et al.

(10) Patent No.: US 6,550,706 B2
(45) Date of Patent: Apr. 22, 2003

(54) PEPPER GRINDER

(75) Inventors: Yu-Kang Lee, Taipei (TW); Shih-Hwa Yuan, Taipei Hsien (TW)

(73) Assignees: Jung Kuo Enterprise Co., Ltd., Taipei (TW); Yellowtails Industrial Ltd., Taipei Hsien (TW)

( * ) Notice: Subject to any disclaimer, the term of this patent is extended or adjusted under 35 U.S.C. 154(b) by 151 days.

(21) Appl. No.: 09/793,616

(22) Filed: Feb. 27, 2001

(65) Prior Publication Data

US 2002/0117567 A1 Aug. 29, 2002

(51) Int. Cl.⁷ .................................................. A47J 42/00
(52) U.S. Cl. ................................. 241/169.1; 241/285.1; 241/168
(58) Field of Search ........................... 99/510; 241/165, 241/168, 169.1, 285.1, 259.1

(56) References Cited

U.S. PATENT DOCUMENTS 5,722,606 A * 3/1998 Wu .......................... 241/169.1
5,785,264 A * 7/1998 Yang ........................ 241/169.1
5,865,384 A * 2/1999 Pai ........................ 241/169.1 X

FOREIGN PATENT DOCUMENTS

DE                29913286      * 11/1999  .............. 241/169.1

* cited by examiner

Primary Examiner—W. Donald Bray
(74) Attorney, Agent, or Firm—Rosenberg, Klein & Lee

(57) ABSTRACT

A pepper grinder has a grinding assembly including an inner grinding member and an outer grinding member turnable relative to each other to grind pepper in between. The outer grinding member is secured in a lower housing member by means of a lower securing ring connected to the outer grinding member; the securing ring has saw teeth projecting from an upper edge, and is pressed into the lower housing for the pointed ends of the saw teeth to be inserted into the inner side of the lower housing such that the outer grinding member can't turn relative to the lower housing. The inner grinding member is also secured to an upper housing by a securing ring of the kind. Thus, the inner grinding member can turn relative to the outer one when the upper housing is turned relative to the lower housing.

6 Claims, 4 Drawing Sheets

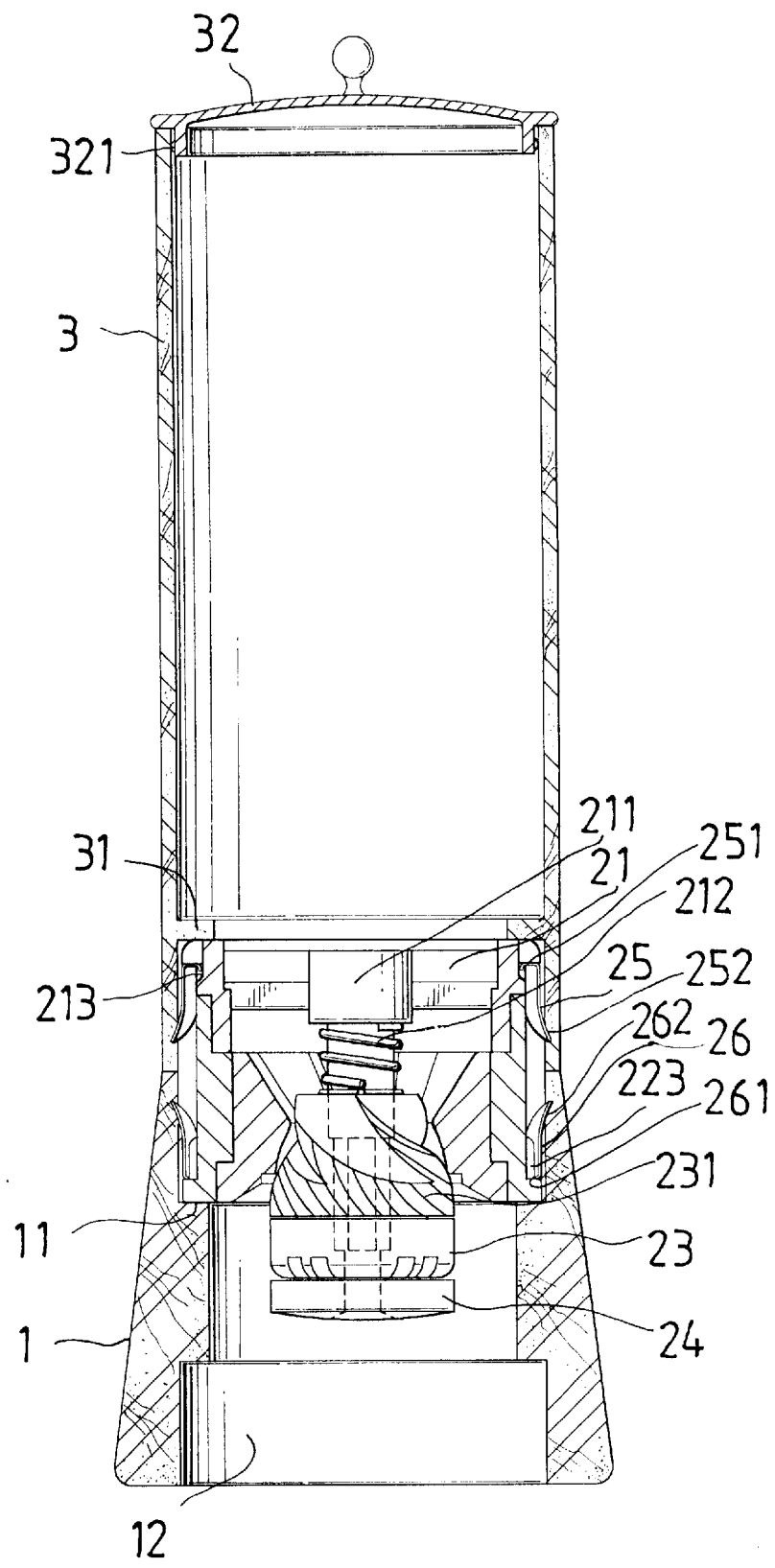
F I G. 2

PEPPER GRINDER

BACKGROUND OF THE INVENTION

Pepper is a main seasoning in dining. Peppercorns are the original form of pepper, and have to be crushed into small pieces before they are provided on the dining table.

Many kinds of pepper grinders have been devised to crush peppercorns into small pieces. Referring to FIG. 5, one of the conventional pepper grinders 4 has a grinding assembly 42 having an inner grinding part and an outer grinding part turnable relative to each other to grind pepper in between. The inner grinding part of the grinding assembly 42 is fixedly housed in an upper housing member 41, and the outer grinding part of the grinding assembly 42 is fixedly housed in a lower housing member 43 such that a user can turn the upper housing member 41 relative to the lower housing member 43 to grind pepper between the inner grinding part and the outer grinding part; the lower housing member 43 has a bottom opening 431 for small pieces of ground pepper to be dispensed therefrom.

Because the grinding parts of the grinding assembly 42 are attached to the housing members 41 and 43 by means of hot melt adhesive, the pepper grinder is found to have disadvantages as follows:

1. When the hot melt adhesive is not applied to the joint between the grinding assembly and the housing members enough, the grinding assembly can't be secured to the housing members. When the hot melt adhesive is applied to the joint too much, same will form hairy edge on the housing members, and consequently, the housing members can't turn relative to each other smoothly.
2. The grinding assembly is likely to loosen on the housing members after long time of use.

SUMMARY OF THE INVENTION

Therefore, it is a main object of the present invention to provide a pepper grinder which has a grinding assembly capable of being easily and securely housed in the housing members.

The pepper grinder has a grinding assembly including an outer grinding member and an inner grinding member; the grinding members have opposing grinding teeth such that pepper can be ground in between when one turns relative to the other.

The outer grinding member is secured in a lower housing member by means of a lower securing ring; the lower securing ring has saw teeth projecting upwards, and the saw teeth are inserted into an inner side of the lower housing member from pointed ends. The lower securing ring is also connected to the outer grinding member such that the latter can't move relative to the lower housing member.

The inner grinding member is connected to a locating member, which is also secured to an upper housing member by means of a securing ring of the kind such that the grinding member can't turn relative to the upper housing member. Therefore, when the upper housing member is turned relative to the lower housing member, the inner grinding member can turn relative to the outer grinding member to grind pepper in between.

BRIEF DESCRIPTION OF THE DRAWINGS

This invention will be better understood by referring to the accompanying drawings, wherein:

FIG. 2 is a cross-sectional view of the pepper grinder of the present invention.

DETAILED DESCRIPTION OF THE PREFERRED EMBODIMENT

Figure 1:
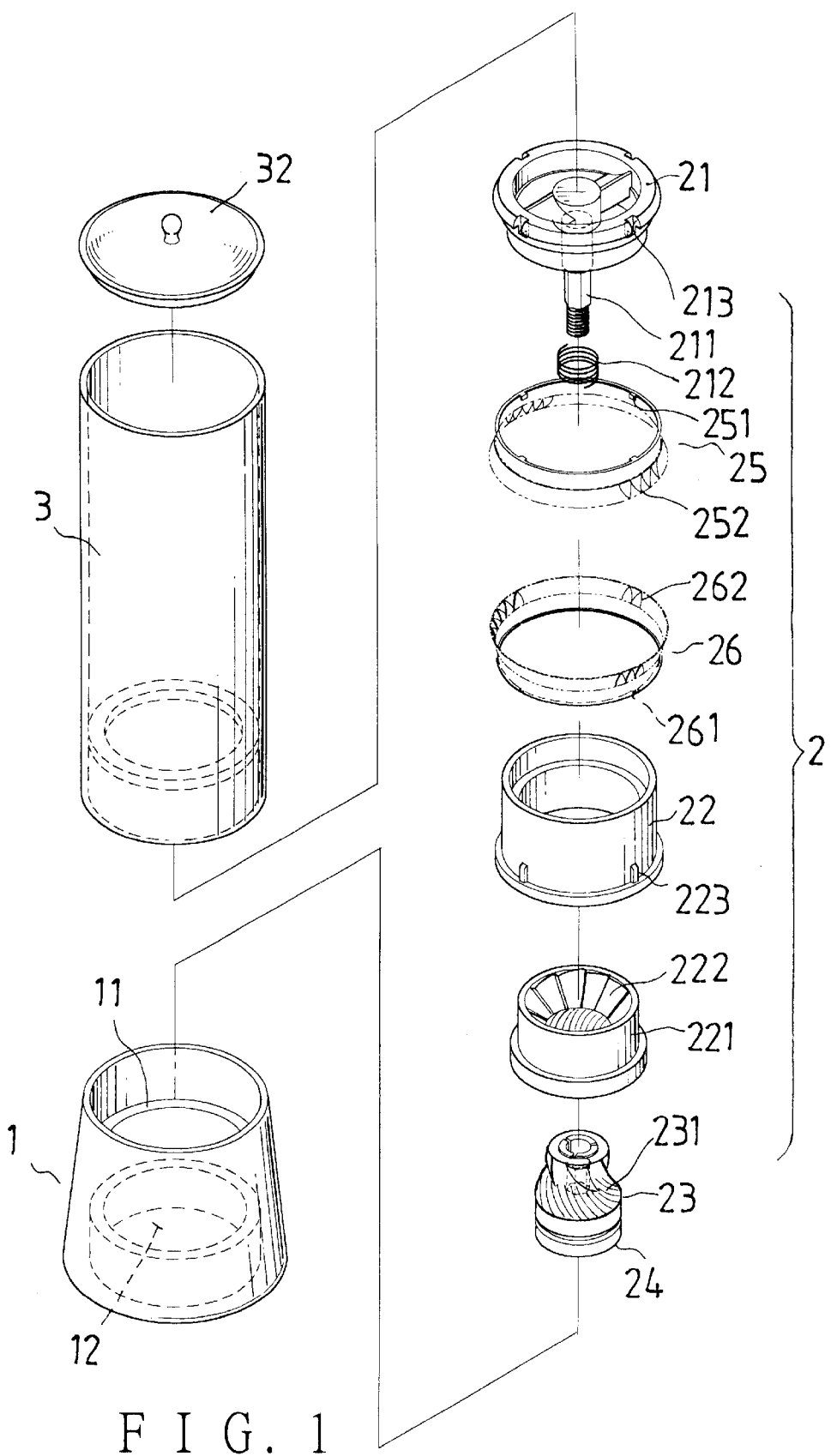
FIG. 1 is an exploded perspective view of the pepper grinder of the present invention.
Figure 5:
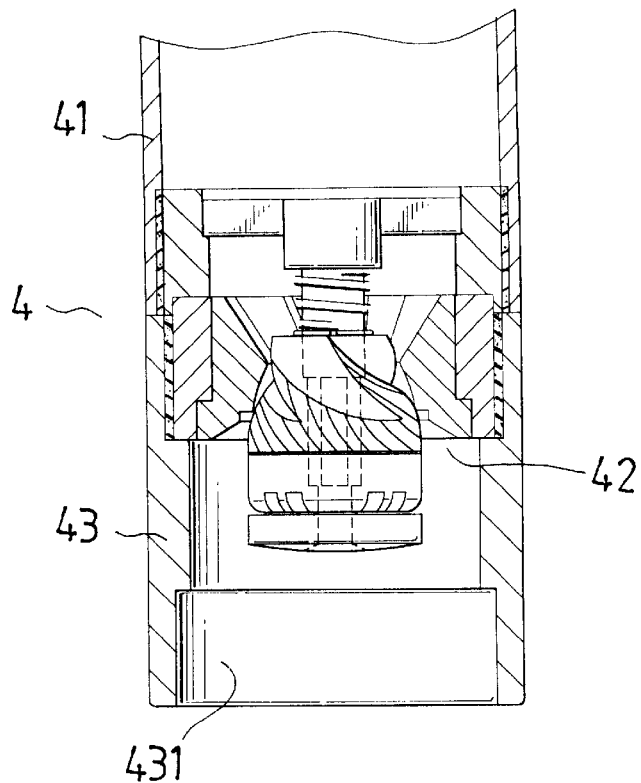
FIG. 5 is a fragmentary cross-sectional view of the conventional pepper grinder in the Background.
Figure 3:
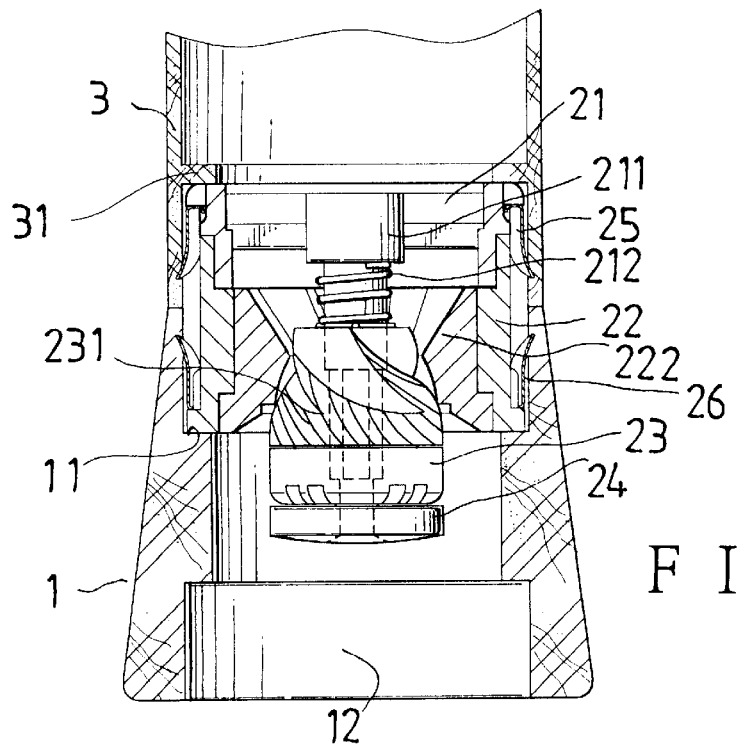
FIG. 3 is a fragmentary cross-sectional view of the pepper grinder of the present invention.
Figure 4:
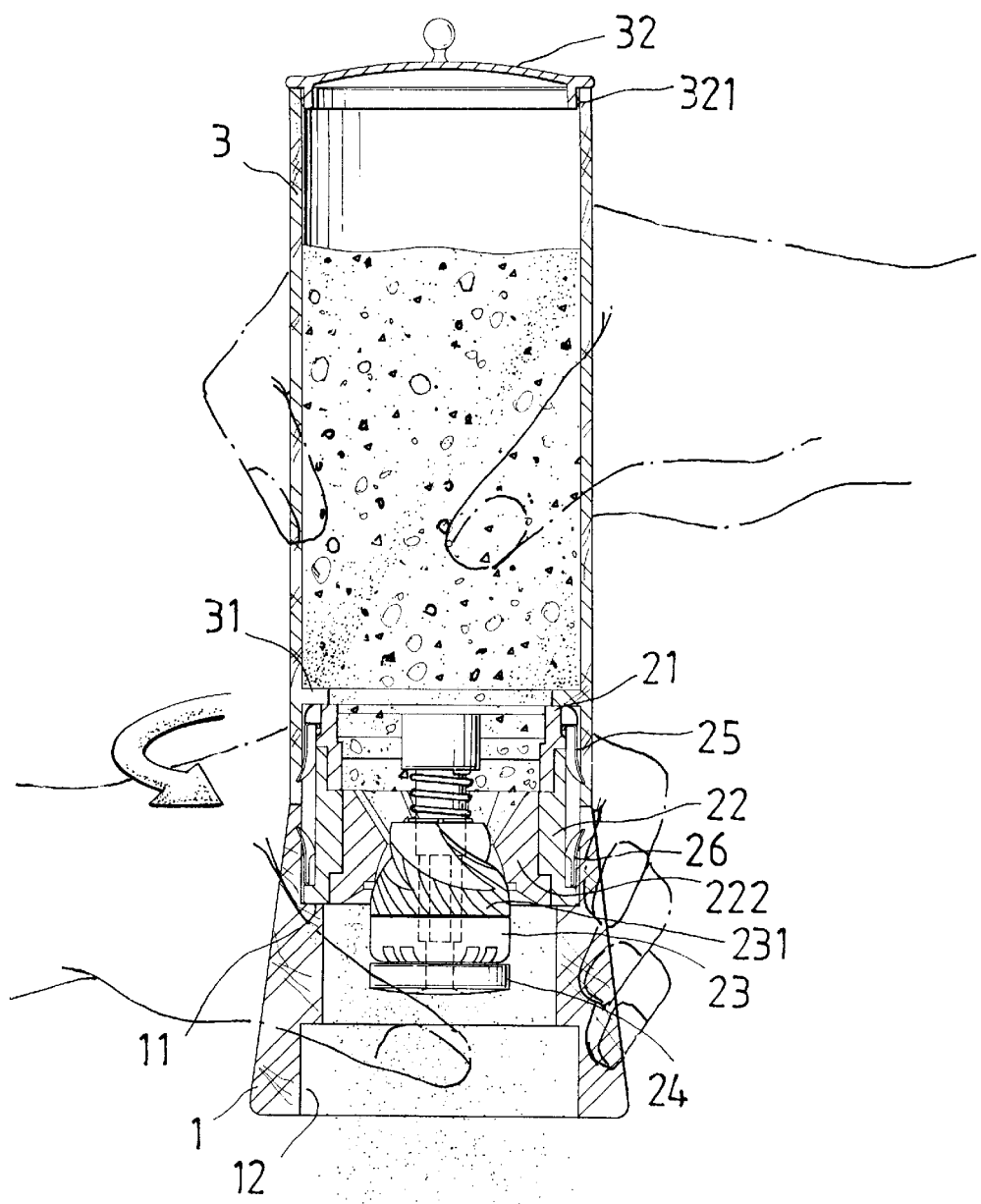
FIG. 4 is a view showing the pepper grinder of the present invention under use.

Referring to FIG. 1, a pepper grinder of the present invention has a lower housing member 1, a grinding assembly 2 and an upper housing member 3.

The lower housing member 1 has an annular locating protrusion 11 on an inner side, and an opening 12 on a bottom. Both the lower and the upper housing members 1 and 3 can be made of wood, plastic or metal.

The grinding assembly 2 has a locating member 21, an outer grinding member 22, an inner grinding member 23, an adjustment knob 24, an upper securing ring 25 and a lower securing ring 26.

The outer grinding member 22 is disposed in the lower housing member 1 with a bottom supported by the annular locating protrusion 11 of the lower housing member 1. The outer grinding member 22 has several connecting protrusions 223 on an outer side, and a toothed element 221 disposed therein; the toothed element 221 has grinding teeth 222 on an inner side.

The lower securing ring 26 has saw teeth 262 spaced apart, and at least slightly bent outwardly from an upper edge. The lower securing ring 26 further has several gaps 261 on an inner side. The lower securing ring 26 is pressed into the lower housing member 1 with the gaps 261 connecting the connecting protrusions 223 of the outer grinding member 22; the saw teeth 262 being inserted into the inner side of the lower housing member 1 from the pointed ends to present the lower securing ring 26 from moving relative to the lower housing member 1. Thus, the outer grinding member 22 is secured to the lower housing member 1.

The locating member 21 has several gaps 213 on an outer side, and a connecting rod 211 projecting from a center of the bottom. The locating member 21 is disposed in the upper housing member 3, and confined by an annular locating protrusion (not numbered) of the inner side of the upper housing member 3.

The upper securing ring 25 has saw teeth 252 spaced apart, and slightly bent outwardly from a lower edge. The upper securing ring 25 further has connecting protrusions 251 on an inner side. The upper securing ring 25 is pressed into the upper housing member 3 with the connecting protrusions 251 fitted onto the gaps 213 of the locating member 21; the saw teeth 252 being inserted into the inner side of the upper housing member 3 from the pointed ends to prevent the upper securing ring 25 from moving relative to the upper housing member 3. Thus, the locating member 21 is secured to the upper housing member 3.

The inner grinding member 23 has grinding teeth 231 on an outer side, and is connected to the connecting rod 211 of the locating member 21, an elastic member 212 biasing same downwards, and turnably received in the toothed element 221. The adjustment knob 24 is disposed on the bottom of the inner grinding member 23, and connected to a lower threaded end portion of the connecting rod 211 of the locating member 21 in order to secure the inner grinding member 23 to the locating member 21; the adjustment knob 24 can be turned to adjust a position of the inner grinding member 23 relative to the outer grinding member 22.

Thus, the inner grinding member 23 can turn relative to the outer grinding member 22 to grind pepper between the grinding teeth 222 and 231 into small pieces when the user turns the upper housing member 3 relative to the lower housing member 1. Ground pepper particulates are dispensed through the opening 12 of the lower housing member 1.

The upper housing member 3 has an annular locating protrusion 31 formed in a lower position of the upper housing member 3. The upper housing member 3 further has a cover 32 for an upper opening where pepper is put into the pepper grinder. Referring to FIG. 2, the cover 32 has securing protrusions 321 opposing the inner side of the upper housing member 3 when same is coupled to the housing member 3; thus, the cover 32 can be coupled to the housing member 3 more firmly.

From the above description, the pepper grinder of the present invention can be known to have desirable features as follows:

1. The locating member 21 and the outer grinding member 22 can be securely and easily fixed to the housing member 3 and 1 respectively by means of the upper and lower securing rings 25 and 26.
2. The securing rings 25 and 26 are connected to the locating member 21 and the outer grinding member 22 by means of fitting the connecting protrusions 251 and 223 onto the gaps 213 and 261 so the locating member 21 and the outer grinding member 22 can't loosen on the securing rings 25 and 26 even after long time of use.
3. The cover 32 can be relatively firmly coupled to the upper housing member 3 because of the securing protrusions 321, i.e. same is protected from accidentally falling off the pepper grinder.

What is claimed is:

1. A pepper grinder comprising:
   (a) a housing having first and second housing members disposed in angularly displaceable manner one relative to the other;
   (b) a grinding assembly disposed in said housing, said grinding assembly including:
      an outer grinding member fixedly coupled to said first housing member by a first securing ring having a plurality of outwardly directed saw teeth retentively engaging a surface of said first housing member, said outer grinding member including a toothed element defining an inner opening and having a plurality of first grinding teeth disposed thereabout;
      a locating member fixedly coupled to said second housing member by a second securing ring having a plurality of outwardly directed saw teeth retentively engaging a surface of said second housing member;
      an inner grinding member secured to said locating member for angular displacement therewith, said inner grinding member extending into said inner opening of said outer grinding member toothed element, said inner grinding member having formed thereon a plurality of second grinding teeth opposing said first grinding teeth;
      whereby said inner and outer grinding members are actuable to grind a material introduced between said first and second grinding teeth thereof responsive to angular displacement said first and second housing members one relative to the other.

2. The pepper grinder as recited in claim 1 wherein said first securing ring has formed therein a plurality of angularly spaced gaps for respectively receiving a plurality of connecting protrusions formed on said outer grinding member, said first securing ring being thereby locked against angular displacement from said outer grinding member.

3. The pepper grinder as recited in claim 1 wherein said second securing ring has formed therein a plurality of angularly spaced connecting protrusions for respectively receiving a plurality of gaps formed in said locating member, said second securing ring being thereby locked against angular displacement from said locating member.

4. The pepper grinder as recited in claim 1 wherein said second housing member forms an upper housing member having an upper opening, and includes a cover detachably coupled to said upper opening, said cover having formed thereon a plurality of securing protrusions engaging an inner side of said upper housing member.

5. The pepper grinder as recited in claim 1 wherein said first and second housing members are each formed of a material selected from the group consisting of: wood, plastic, and metal.

6. The pepper grinder as recited in claim 1 wherein said saw teeth of said first and second securing rings each arcuately extend radially outward therefrom.

* * * * *